SAMUEL SMITH.

Reversible-Broiler.

No. 126,585. Patented May 7, 1872.

UNITED STATES PATENT OFFICE.

SAMUEL SMITH, OF BROOKLYN, NEW YORK.

IMPROVEMENT IN REVERSIBLE BROILERS.

Specification forming part of Letters Patent No. 126,585, dated May 7, 1872.

Specification of an Improved Reversible Broiler, invented by SAMUEL SMITH, of the city of Brooklyn, in the county of Kings and State of New York.

This invention consists in a novel construction of a broiler composed of two parts fitting together, so as to be reversible, as hereinafter described, the inner faces of which have guttered bars transversely connecting with annular gutters, as represented in the accompanying drawing, in which—

Figure 1:
Figure 2:
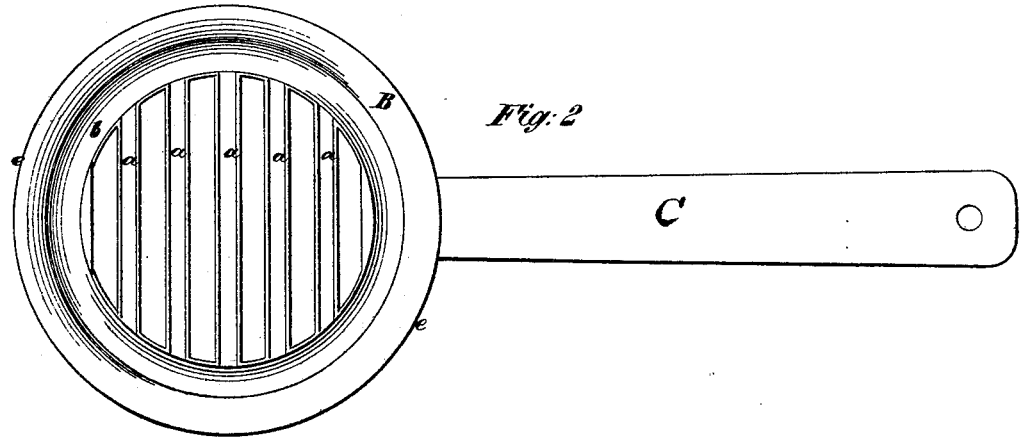
Figure 3:
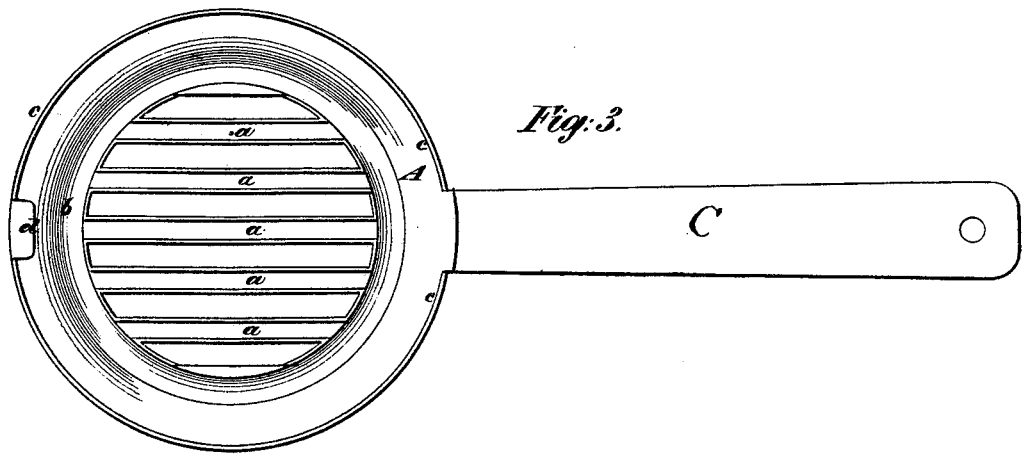

Figure 1 is a central section of the broiler in condition for use. Fig. 2 is a face view, showing the two halves of the broiler detached.

Similar letters of reference indicate corresponding parts in both figures.

A and B are the two pieces of which the body of the broiler is composed, made of sheet metal by cutting and stamping. They may be of circular or other convenient form, with internally-grooved bars, the grooves $a\ a$ of which communicate in each with a surrounding gutter or channel, $b$, and they are of such depth that when placed together they resemble a box, the depth of which is so much greater than the thickest piece of meat to be broiled that the meat may lie loosely within and rest upon the bars of the lower piece without touching or being pressed by the bars of the upper piece. They are alike, except that the rim $e$ of the piece B is made to fit within the rim $c$ of the piece A, and the latter is furnished, opposite its handle, with a turned-in hook, $d$, to lap over the said rim $e$. Each is furnished with a separate handle, C, which is riveted to it. These handles are so formed that they come close together, so that they combine to form a single handle, and, when held together in the hand, keep the hook $d$ hooked over the rim $e$, and secure the two parts A and B firmly together. The two parts may be detached entirely from each other by simply separating the handles a suitable distance and unhooking the hook $d$ from the rim $e$.

Heretofore the parts of reversible broilers have been hinged together, and the meat or other substance or article to be cooked clamped tightly between them. This is very objectionable, for when the lower bars are heated sufficiently to burn the meat and make it stick to them the burning will continue after the broiler is turned over until the bars become cool, and the only way in which the burning can be arrested earlier is by opening the broiler, which also, being made of sheet or thin metal, speedily absorbs heat and cools off on being reversed.

Now, by my invention, the removal of the meat from contact with the heated bars may be effected simply by turning the broiler over and allowing it to drop onto the bars of the other piece of the broiler. The turning over can be done without losing much of the gravy, for it will run from the gutter in which it collected to that in the opposite piece of the broiler.

Claim.

A broiler, composed of the two parts A and B, serrated and struck up in guttered form, as shown and described, and connected by the hook $d$ and handle C C, substantially as specified, as an improved article of manufacture.

SAMUEL SMITH.

Witnesses:
 FRED HAYNES,
 FERD TUSCH.